(12) United States Patent
Chant

(10) Patent No.: US 11,370,641 B2
(45) Date of Patent: Jun. 28, 2022

(54) LIGHTWEIGHT AND FLEXIBLE LOAD BEARING SHACKLE UTILIZING A PLURALITY OF LOOPS OF FIBER ROPE AS A BOW

(71) Applicant: Chant Engineering Co. Inc., New Britain, PA (US)

(72) Inventor: Philip Chant, Perkasie, PA (US)

(73) Assignee: Chant Engineering Co. Inc., New Britain, PA (US)

( * ) Notice: Subject to any disclaimer, the term of this patent is extended or adjusted under 35 U.S.C. 154(b) by 0 days.

(21) Appl. No.: 16/926,978

(22) Filed: Jul. 13, 2020

(65) Prior Publication Data

US 2020/0339391 A1 Oct. 29, 2020

Related U.S. Application Data

(63) Continuation-in-part of application No. 16/273,433, filed on Feb. 12, 2019, now Pat. No. 10,717,630.

(51) Int. Cl.
| | |
|---|---|
| *B66C 1/66* | (2006.01) |
| *F16G 15/06* | (2006.01) |
| *B66C 1/12* | (2006.01) |
| *B66C 1/18* | (2006.01) |

(52) U.S. Cl.
CPC .............. *B66C 1/12* (2013.01); *B66C 1/18* (2013.01); *F16G 15/06* (2013.01); *B66C 1/66* (2013.01)

(58) Field of Classification Search
CPC .... B66C 1/12; B66C 1/18; B66C 1/66; F16G 15/04; F16G 15/06; F16G 11/146

USPC ............................. 294/74, 82.1, 82.16; 59/86
See application file for complete search history.

(56) References Cited

U.S. PATENT DOCUMENTS

| 2,426,538 | A | * | 8/1947 | Von Wehrden | ............ | B66C 1/12 |
| | | | | | | 403/210 |
| 2,495,951 | A | * | 1/1950 | Von Wehrden | ....... | F16G 11/146 |
| | | | | | | 403/210 |
| 3,722,942 | A | * | 3/1973 | Baur | ......................... | B66C 1/18 |
| | | | | | | 294/74 |
| 4,215,463 | A | * | 8/1980 | Crook | ...................... | B66C 1/12 |
| | | | | | | 24/122.6 |

(Continued)

FOREIGN PATENT DOCUMENTS

WO WO-2020245771 A1 * 12/2020 ............. F16G 15/06

*Primary Examiner* — Dean J Kramer
(74) *Attorney, Agent, or Firm* — Douglas J. Ryder; Ryder, Mazzeo & Konieczny LLC

(57) ABSTRACT

A lightweight and flexible load bearing shackle that is configurable in operation. The shackle includes a bow made of a plurality of loops of synthetic fiber rope (e.g., polypropylene, nylon, polyester, polyethylene, Aramid, acrylic, mixtures of several fibers, co-polymer fibers, straight, braided, twisted). The loops of fiber rope may be contained within a sheathing configured as a single loop. The sheathing is secured together to form a receptacle (opening) in each leg of the bow that is reinforced with an eyelet. The eyelets may be split eyelets that include a first/second side mounted to a first/second side of the receptacle that are then secured together over the receptacle. A connection pin may be secured between the eyelets. The shackle may include a spacing mechanism (e.g., casing that connection pin traverses, connection pin that has wider center portion) between the legs to maintain the legs a certain distance apart.

20 Claims, 14 Drawing Sheets

(56) References Cited

U.S. PATENT DOCUMENTS

| | | | | |
|---|---|---|---|---|
| 4,255,836 | A | * | 3/1981 | Dunahoo .................. D07B 1/18 |
| | | | | 24/122.6 |
| 5,018,775 | A | * | 5/1991 | McKenna ............. F16G 11/146 |
| | | | | 294/74 |
| 5,415,449 | A | * | 5/1995 | Kentner, Sr. .............. B66C 1/12 |
| | | | | 294/74 |
| 10,072,698 | B2 | * | 9/2018 | Pautsch ..................... B66C 1/34 |
| 10,717,630 | B1 | * | 7/2020 | Chant ....................... B66C 1/18 |

\* cited by examiner

LIGHTWEIGHT AND FLEXIBLE LOAD BEARING SHACKLE UTILIZING A PLURALITY OF LOOPS OF FIBER ROPE AS A BOW

PRIORITY

This application is a continuation-in-part (CIP) of, and claims priority to, U.S. application Ser. No. 16/273,433 entitled "Light Weight Load Bearing Shackle with Fiber Rope Bow" which was filed on Feb. 19, 2019 with Philip Chant as inventor. Application Ser. No. 16/273,433, which will issue as U.S. Pat. No. 10,717,630 on Jul. 21, 2020, is herein incorporated by reference in its entirety.

BACKGROUND

Shackles are devices that may provide a quick, convenient, secure and strong connection. They may also be capable of quickly and conveniently being disconnected. Shackles typically include a bow and a connection pin. The bow may be "U" shaped so as to have an open end and a closed end. The bow typically includes holes on each of the legs thereof so to receive the connection pin. The connection pin passes through each of the holes to seal off the open end of the bow and is then secured thereto. The connection pin may include one end that is larger than the holes so as to not pass therethrough. The other end may pass through the holes and then be secured within the bow in some fashion. For example, the other end of the connection pin may be threaded so as to receive a nut in order to secure the pin within the bow. Alternatively, the other end of the connection pin may include a hole formed therein that can receive a pin to secure the connection pin within the bow.

The connection pin may be removed from the bow so as to open the shackle so that the bow may be placed on an item. The connection pin may then be secured to the bow so as to secure the shackle to the item. Shackles vary in size, shape, orientation and configuration depending on what they are used for. Shackles may be used in lifting operations to connect an object to a lifting apparatus, such as a crane (often referred to as load bearing shackles). The manner in which the shackles are utilized to connect the object to the lifting apparatus may vary depending on numerous factors including, but not limited to, type of lifting apparatus used, and size and weight of object to be lifted. Load bearing shackles are typically made with a heavy duty, strong and durable material, such as, steel.

Cranes and other industrial equipment are used to hoist and move cargo, equipment and other heavy objects (hereinafter simply referred to as "load" for simplicity). The cranes may utilize cables and a plurality of pullies to lift and move the loads. The cables utilized were typically metal (e.g., steel) cables that were very strong and durable. The steel cables are very heavy and could be susceptible to corrosion (e.g., rusting). Synthetic rope cables have begun to be used as alternatives to the steel cables. The synthetic rope cables are made from hi-tech polyethylene, synthetic rope and are lighter weight and more flexible that steel cables. The lighter weight of the synthetic rope cables may make handling easier and also may enable heavier loads to be lifted (as the weight of the cable is included in the maximum load calculation of the lifting apparatus).

The weight associated with load bearing shackles may make them hard to handle, and in certain circumstances may require a lifting apparatus to put in place. Furthermore, the weight factures into the maximum load calculations. Moreover, the rigid form of the load bearing shackles makes them tough to utilize in certain situations, for example, where space is limited. What is needed is a lightweight load bearing shackle that is strong, durable and safe to use. Moreover, a load bearing shackle that is flexible so that it can be utilized in various situations, including where space is limited is desired. Furthermore, a corrosion resistant load bearing shackle is preferable.

BRIEF DESCRIPTION OF THE DRAWINGS

The features and advantages of the various embodiments will become apparent from the following detailed description in which.

DETAILED DESCRIPTION

Figure 1A:
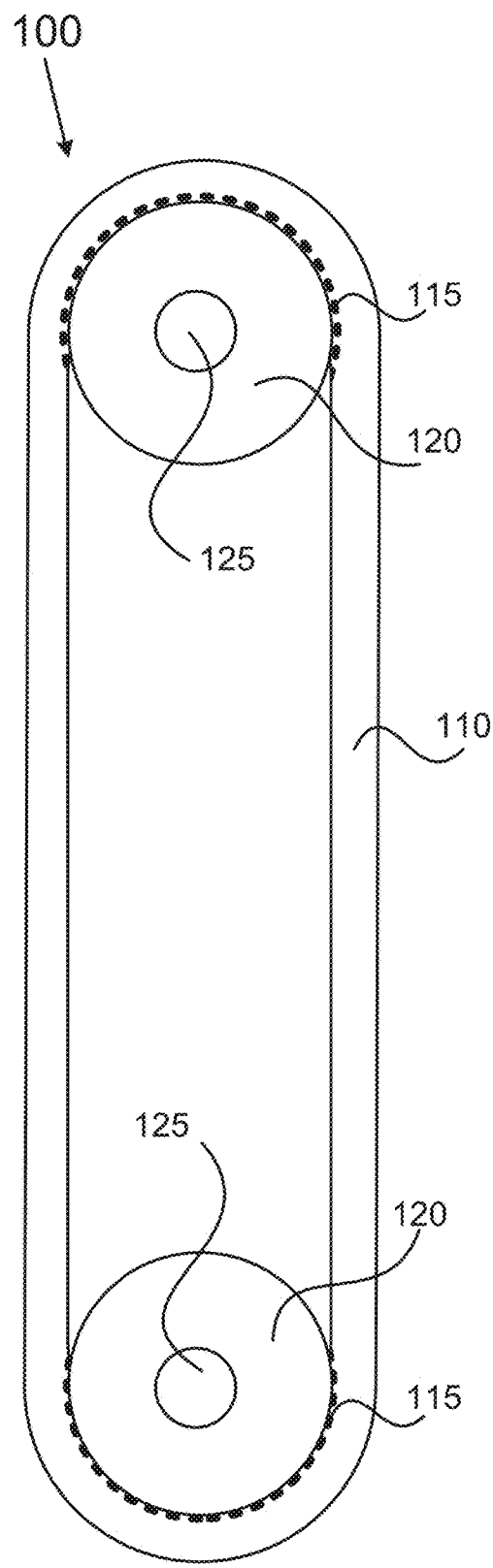
FIGS. 1A-D illustrate top views of example fiber rope bows to be used as part of light weight load bearing shackles, according to various embodiments.

A lightweight load bearing shackle that is corrosion resistant and still provides the strength and durability required to lift loads is provided. The shackle includes a bow that is made of a fiber rope (e.g., synthetic fiber). The fiber rope may be made of, for example, polypropylene, nylon, polyesters (e.g. PET, LCP, Vectran), polyethylene (e.g. Dyneema and Spectra), Aramids (e.g. Twaron, Technora and Kevlar) and acrylics (e.g. Dralon). Some fiber ropes may be constructed of mixtures of several fibers or use co-polymer fibers. The fibers making up the rope may be straight, braided and/or twisted. The number, orientation and configuration of the fibers may vary depending on the type of light weight load bearing shackle it is too be used in. The fibers and/or the fiber rope may be coated. The fiber rope may be contained within a sheathing. The bow may include a plurality of loops of fiber rope or may possibly include a single loop of the fiber rope. The bow may be shaped so as to have two opposing legs (e.g., U shaped) and include a hole formed in some fashion on each of the legs to receive a connection pin so as to secure an open end of the shackle. The hole may be provided by, or reinforced in, various manners in order to support the connection pin. For example, an insert, gromet, eyelet or the like that is made of a heavy-duty material such as steel may be used to support the connection pin. A connection pin may pass through the holes on each leg and be secured therein. As the fiber rope bow is flexible, the connection pin may include some type of support to maintain the legs a certain distance apart.

FIGS. 1A-D illustrate top views of example fiber rope bows to be used as part of light weight load bearing shackles. As illustrated, the bows are in a straight arrangement as opposed to a generally "U" shaped arrangement as is typically associated therewith. The bows include loops of fiber rope 110 and a pair of eyelets 120. As illustrated, the fiber rope loops 110 appears to be a single loop for ease of illustration but is in no way intended to be limited thereto. The fiber rope loops 110 could include multiple loops of fiber rope (all the loops being the same type of rope or possibly using different types of rope) secured together in some fashion or housed within a sleeve. The manner in which the loops 110 are secured together or the material that the loops are housed in may vary without departing from the current scope.

The fiber rope loops 110 are wrapped around each of the eyelets 120. Each of the eyelets 120 includes a hole 125 therein. The eyelets 120 may be made of a strong and durable material, such as, steel. The holes 125 are to receive the connection pin (not illustrated) therein. According to one embodiment, at least one of the holes 125 may be threaded (threads not illustrated) so as to secure the connection pin therein. The fiber rope loops 110 may be secured to the eyelets 120 in some fashion (e.g., glued, molded, fused, bonded, taped, pined, riveted).

FIG. 1A illustrates an example bow 100 where the fiber loops 110 are secured to the eyelets 120 with some connection means 115 therebetween (illustrated as dashed line for ease). The connection means 115 may be, for example, glue, tape, rivet, pin, adhesive, weld and/or mold. The example bow 100 does not include any additional connection means (e.g., external) for securing the fiber loops 110 and the eyelets 120 or for securing sides (e.g., left and right as illustrated) of the fiber rope loops 110 together.

Figure 1B:
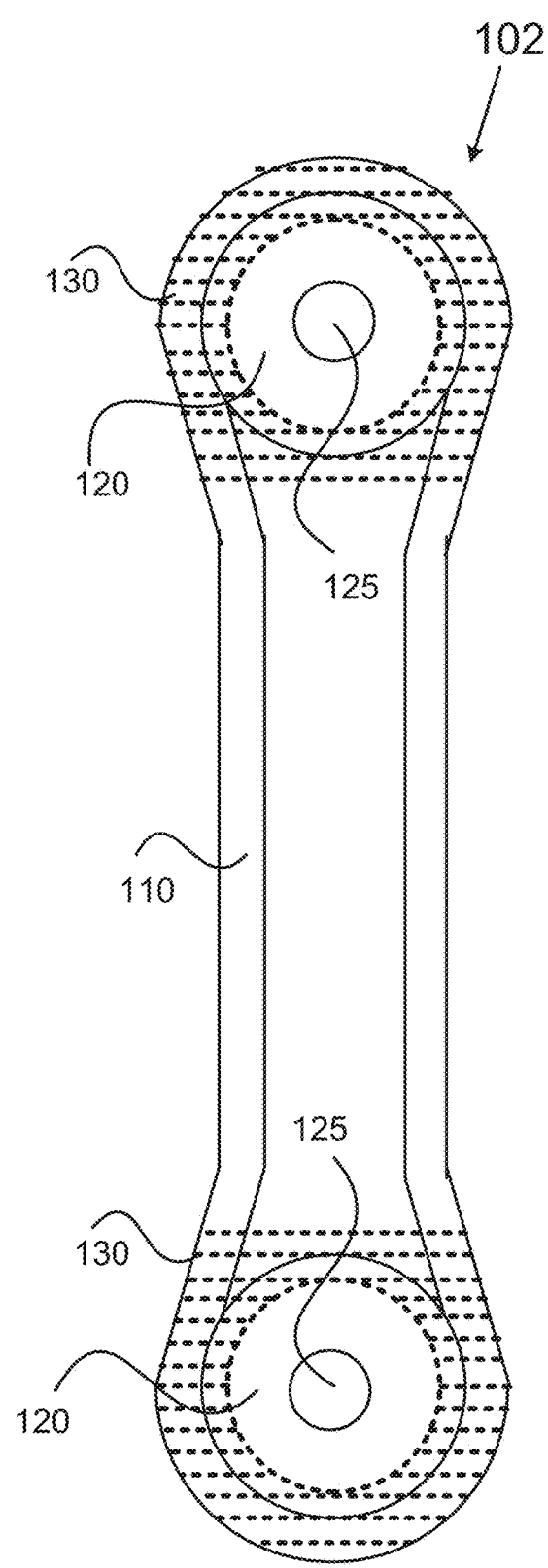

FIG. 1B illustrates an example bow 102 where a connection means 130 (illustrated as dashed lines for ease of illustration) may be located over the fiber rope loops 110 and the eyelets 120 to help secure the fiber rope loops 110 to the eyelets 120. The connection means 130 may be, for example, molded therearound or taped thereto. The connection means 130 may be, for example, plastic, rubber or the like that are formed over and/or wrapped around the loops 110 and the eyelets 120. The connection means 130 may be a sheathing secured over the loops 110 and the eyelets 120.

Figure 1C:
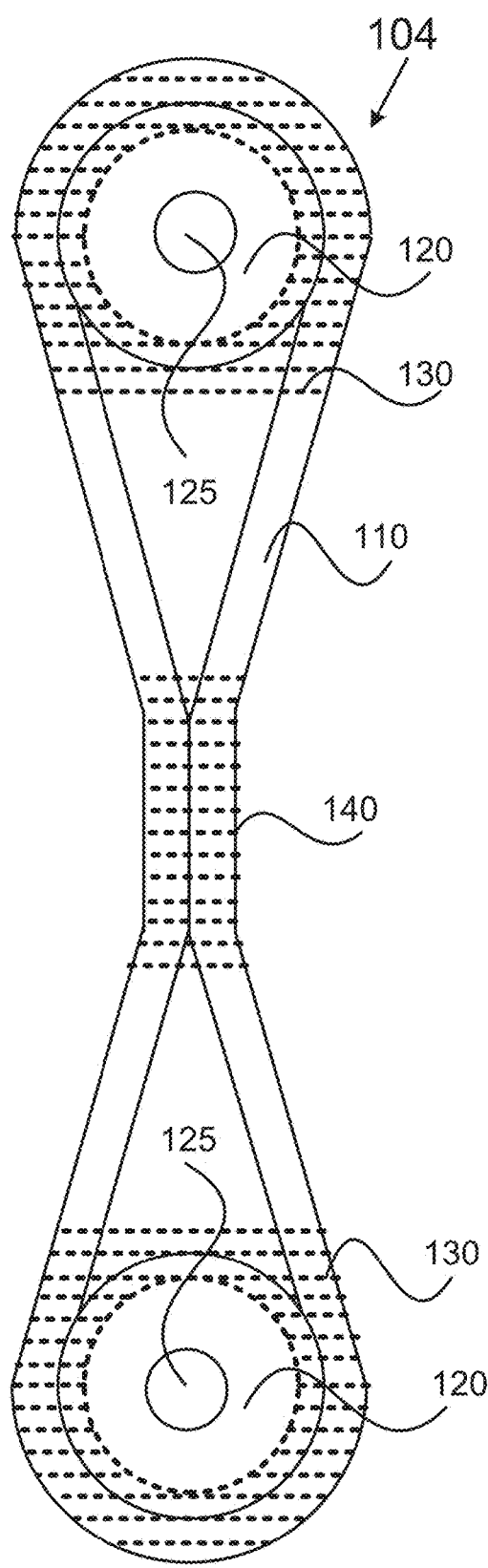

FIG. 1C illustrates an example bow 104 where in addition to the connection means 130 securing the fiber rope loops 110 to the eyelets 120, a connection means 140 (illustrated as dashed lines for ease of illustration) may be located in a center portion of the bow 104 to secure sides (e.g., left and right as illustrated) of the loops 110 between the eyelets 120 together. The connection means 140 is illustrated as being located at a single section that is generally in the center but is not limited thereto. Rather, the connection means 140 may be located at any number of sections, or at any locations, without departing from the current scope. According to one embodiment, the connection means 140 may secure the sides of the loops 110 together the whole, or substantially the whole, distance between the eyelets 120. The connection means 140 may secure the loops 110 together in various manners including, for example, by forming a material (e.g., plastic, rubber or the like) over the two sides, wrapping a material around the two sides, by stitching or gluing the two sides together (if included in a sleeve), or by providing a sleeve over the two sides. The connection means 140 may be the same or may be different than the connection means 130.

Figure 1D:
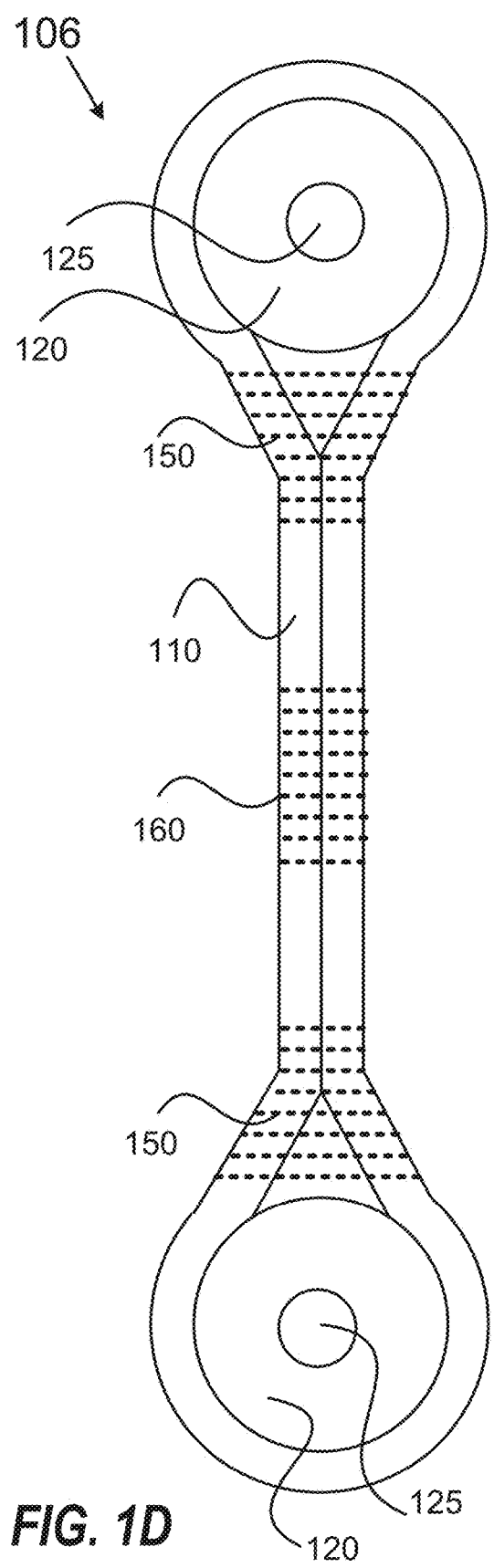

FIG. 1D illustrates a configuration of an example bow 106 where a connection means 150 (illustrated as dashed lines for ease of illustration) secures the two sides of the fiber rope loops 110 together in close proximity to the eyelets 120 to assist in securing the loops 110 and the eyelets 120 together. The connection means 150 may secure the sides of the fiber rope loops 110 together in various manners including, for example, by forming a material (e.g., plastic, rubber or the like) over the two sides, wrapping a material around the two sides, by stitching or gluing the two sides together (if included in a sleeve), or by providing a sleeve over the two sides.

In addition, a connection means 160 (illustrated as dashed lines for ease of illustration) may be utilized to secure the sides of the loops 110 together in the center of the bow 106. The connection means 160 is illustrated as being located at a single section that is generally in the center but is not limited thereto. Rather, the connection means 160 may be located at any number of sections, or at any locations, without departing from the current scope. According to one embodiment, the connection means 160 may secure the sides of the loops 110 together the whole, or substantially the whole, distance between the eyelets 120. The connection means 160 may secure the loops 110 together in various manners including, for example, by forming a material (e.g., plastic, rubber or the like) over the two sides, wrapping a material around the two sides, by stitching or gluing the two sides together (if included in a sleeve), or by providing a sleeve over the two sides. The connection means 160 may be the same or may be different than the connection means 150.

According to one embodiment, the connection means 150, 160 may be a single connection means that runs from close proximity to one eyelet 120 to close proximity to the other eyelet 120.

Figure 2A:
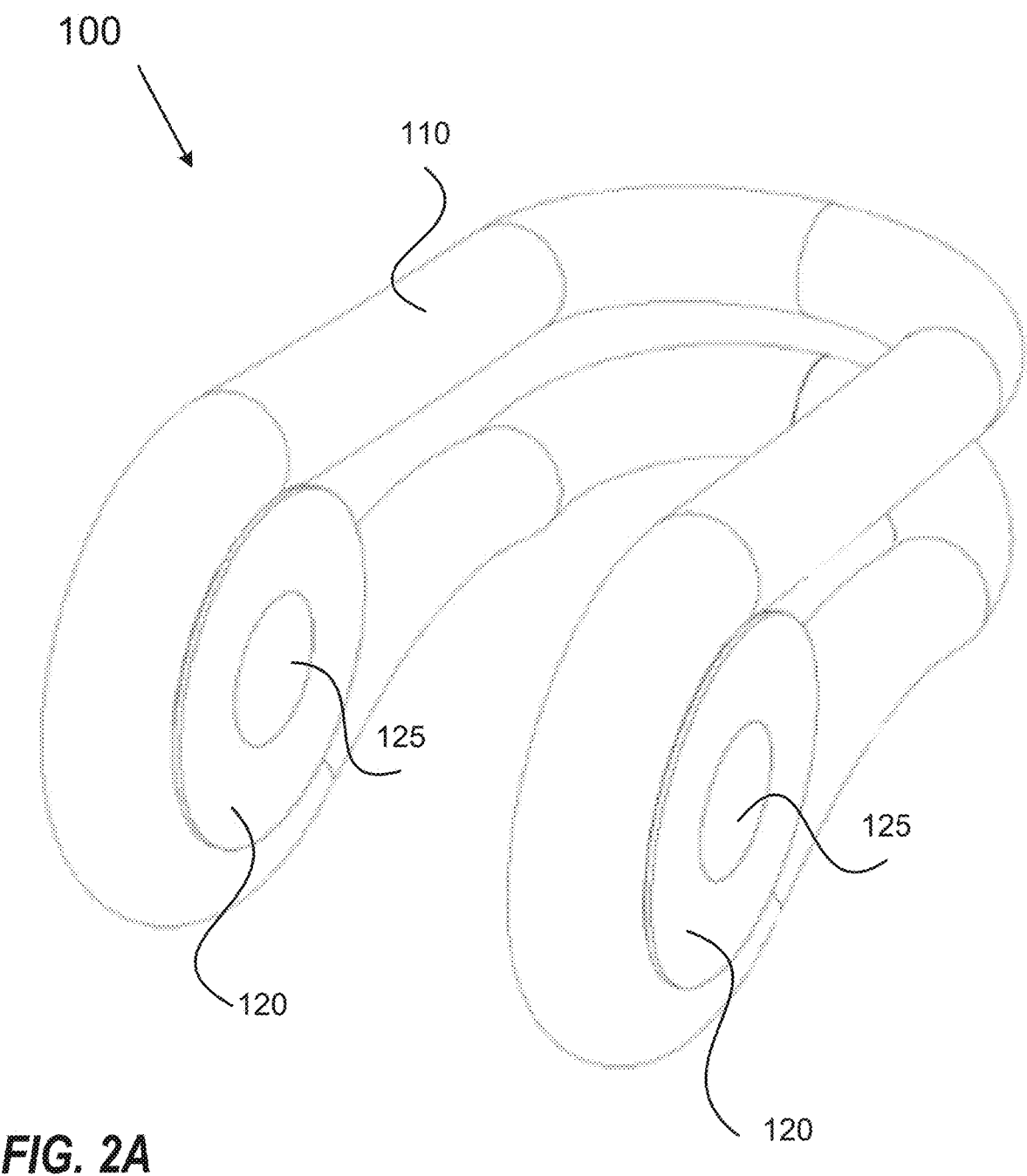
FIGS. 2A-B illustrate perspective views of example fiber rope bows to be used as part of light weight load bearing shackles, according to various embodiments.
Figure 2B:
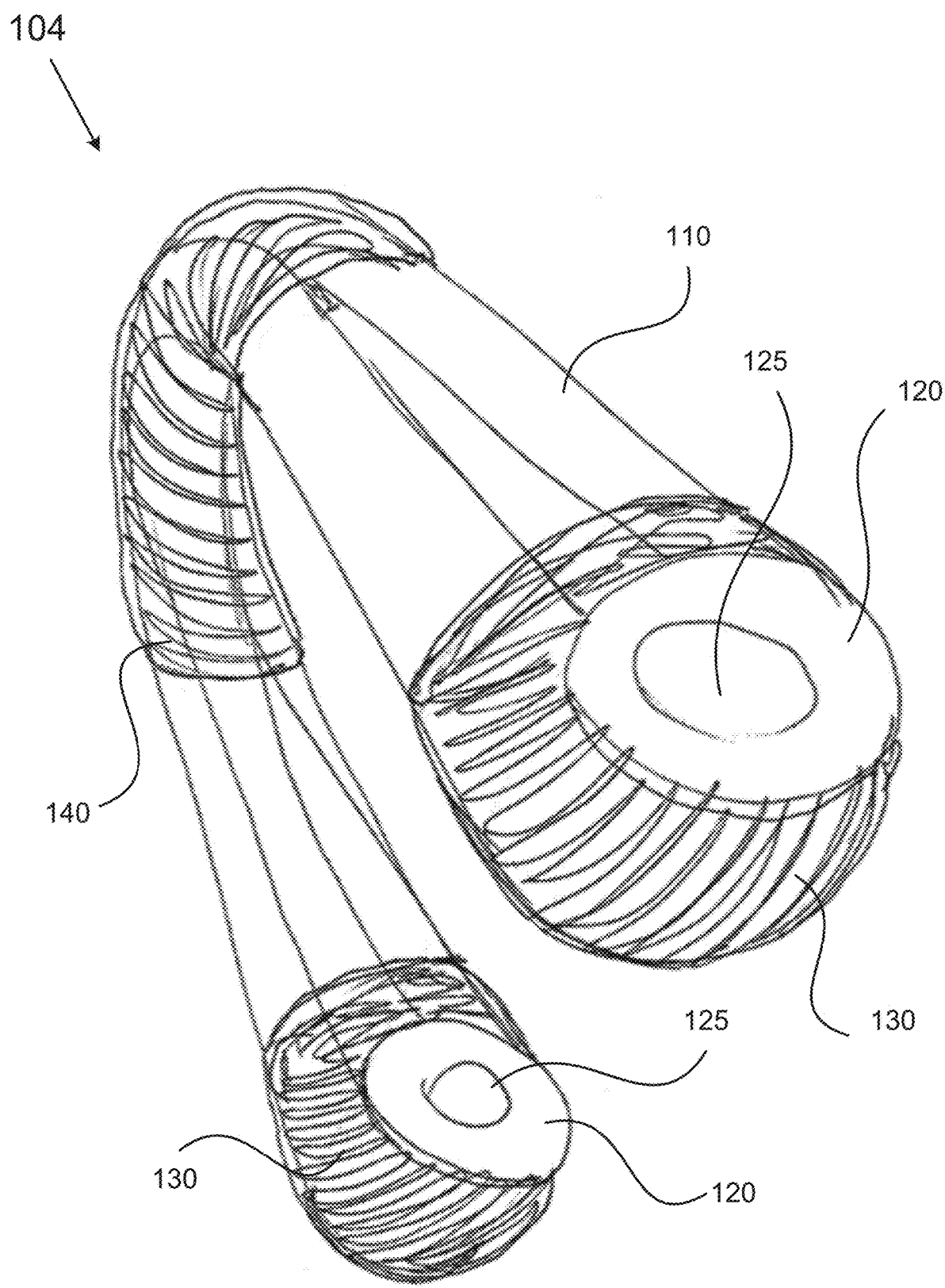

FIGS. 2A-B illustrate perspective views of example fiber rope bows to be used as part of a lightweight load bearing shackle. The bows are illustrated in a generally "U" shape arrangement. FIG. 2A illustrates the bow 100 of FIG. 1A formed into the "U" shape so that the eyelets 120 are aligned with one another a certain distance apart. As the fiber rope loops 110 are flexible the exact configuration of the bow 100 may be adjusted and the configuration may be modified in use. As illustrated, an upper portion and a lower portion of the fiber rope loops 110 are separated to indicate they are not secured together in any fashion but would not remain separated in use.

FIG. 2B illustrates the bow 104 of FIG. 1C formed into the "U" shape so that the eyelets 120 are aligned with one another a certain distance apart. As the rope loops 110 are flexible the exact configuration of the bow 104 may be adjusted and the configuration may be modified in use. According to one embodiment, the connection means 140 may be shaped (e.g., U shaped) over the upper and lower portions of the loops 110 to assist in providing an overall "U" shape for the bow 104.

FIGS. 2A-B do not illustrate a connection pin between the two legs of the bow 100, 104 for ease of illustration. However, the connection pin could be placed through the two eyelets 120 and be secured therein. For example, the connection pin could include a threaded bolt and nut where the bolt passes through each of the eyelets 120 and is secured in place with the nut. The connection pin is not limited to a threaded bolt but could be any type of rod (having sufficient strength) that passes therethrough and is secured therein. Furthermore, the connection pin is not limited to be secured therein with a bolt but could be any type of connection means (e.g., pins, clips, fasteners). As previously mentioned, the fact that the bow 100, 104 is flexible may result in the bow 100, 104 sliding inward along the connection pin. If it was desired to prevent this from occurring a casing may be utilized between the legs of the bow 100, 104.

Figure 3:
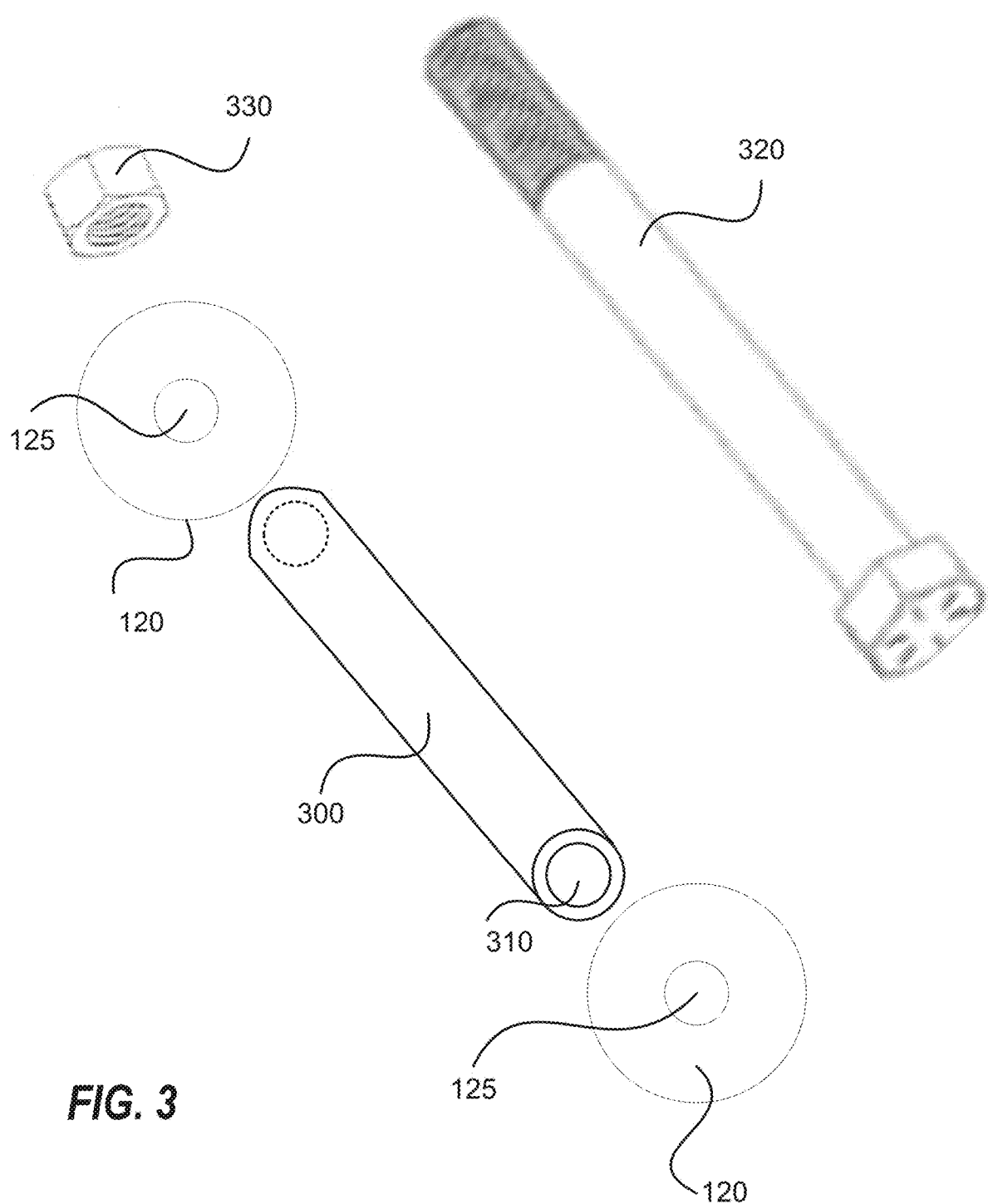
FIG. 3 illustrates an exploded view of an example casing to be used between the eyelets to maintain a minimum distance between the eyelets, according to one embodiment.

FIG. 3 illustrates an exploded view of an example casing 300 capable of being used between the eyelets 120 to maintain a minimum distance between the eyelets 120. For ease of illustration the bow is not illustrated in FIG. 3. The casing 300 has a length associated with the minimum distance. The casing 300 has an open interior 310 traversing the length thereof to enable a connection pin (e.g., bolt) 320 to pass therethrough between the eyelets 120 of the bow. The connection pin 320 may be secured within the bow using, for example, a nut 330. The connection pin 320 is not limited to the bolt (threaded at one end) illustrated and the connector is not limited to the nut 330 illustrated. An outer diameter of the casing 300 is wider than the openings 125 in the eyelets 120 to prevent the legs from moving inward so as to maintain them the minimum distance apart.

According to one embodiment, the casing 300 and the eyelets 120 may be secured together in some fashion. For example, the ends of the casing 300 may be threaded on an outer surface and the openings 125 may be threaded so that they may be screwed together. The minimum distance could be adjusted based on how far the casing 300 was screwed into the openings 125.

Figure 4A:
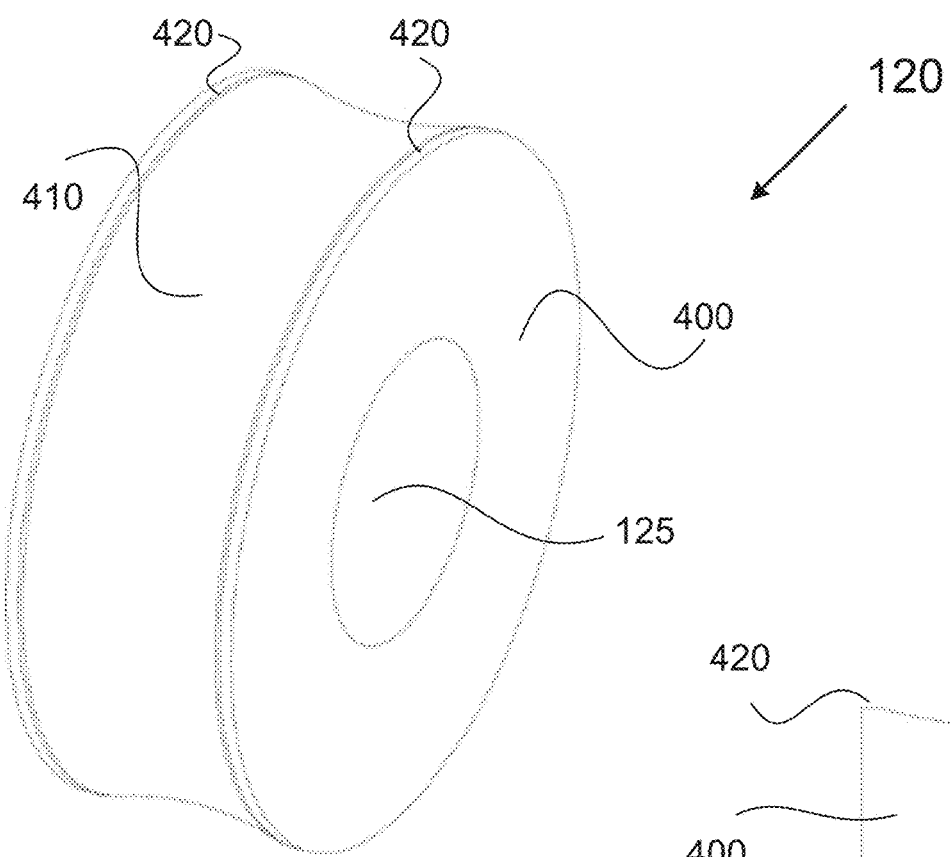
FIGS. 4A-B illustrate perspective and cross-sectional views of an example eyelet, according to one embodiment.
Figure 4B:
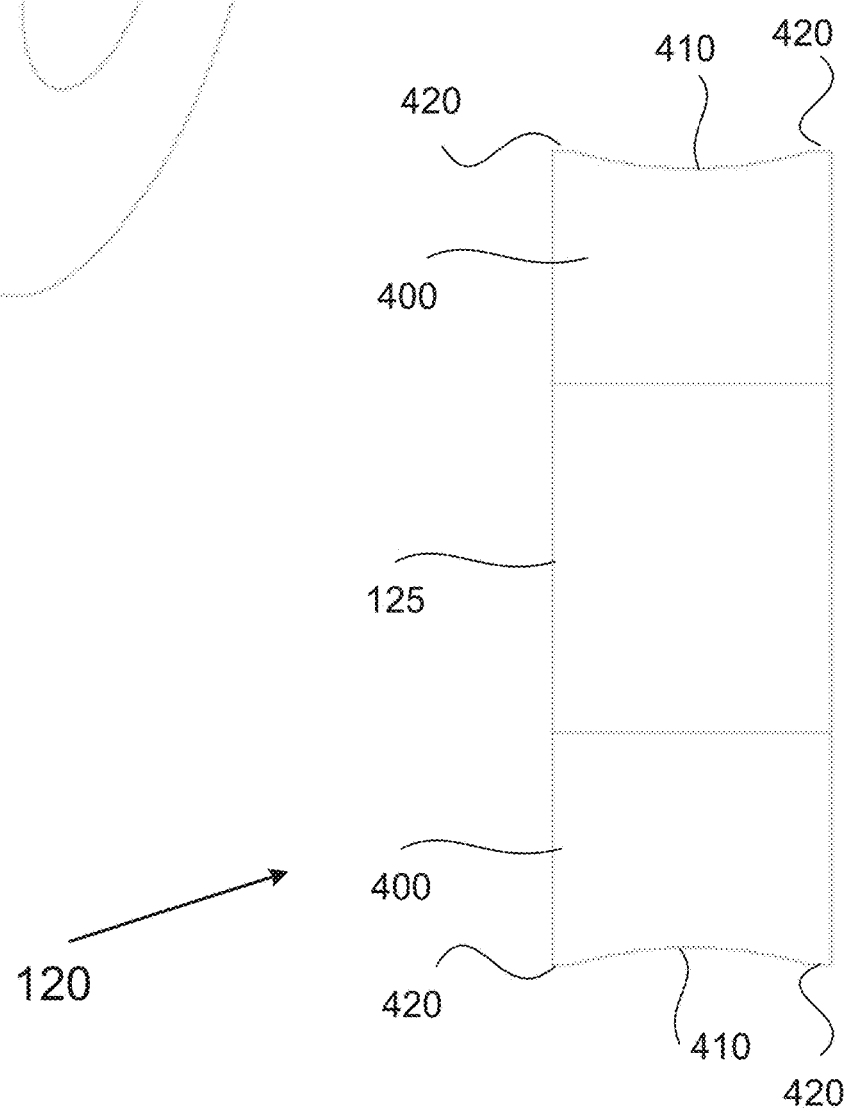

FIGS. 4A-B illustrate perspective and cross-sectional views of an example eyelet 120. The eyelet 120 includes a main body 400 having the opening 125 formed therethrough for receiving a connection pin. An exterior edge of the main body 400 may include a groove 410 formed therein for receiving the fiber rope loops 110. The groove 410 may be surrounded by sidewalls 420. As illustrated, the groove 410 is rounded but is in no way intended to be limited thereto. For example, the groove 410 may be flat on the bottom until it reaches the sidewalls 420 that extend perpendicular therefrom. Such a configuration could enable the rope loops 110 to lay flat therewithin.

The various embodiments illustrated in FIGS. 1A-D and 2A-B had the eyelets 120 secured within the fiber rope loops 110 prior to the fiber rope loops 110 being formed into a "U" shaped bow. According to one embodiment, the "U" shaped bow may be obtained by the fiber rope loops 110 prior to securing to the eyelets 120.

Figure 5A:
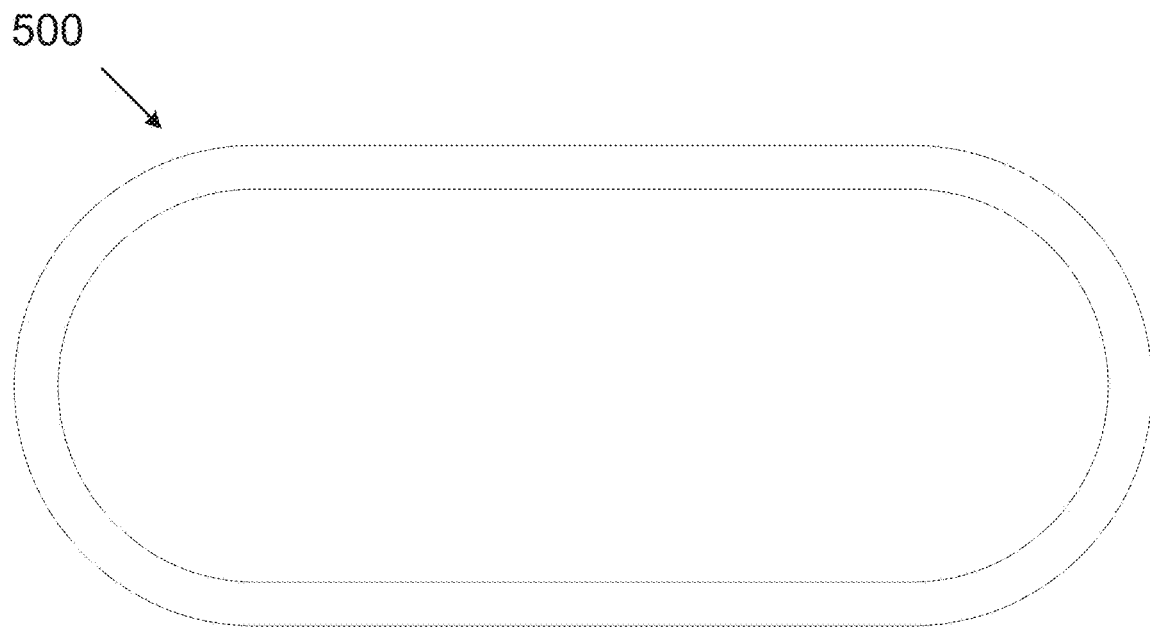
FIGS. 5A-B illustrate an example method for providing a lightweight fiber rope bow in a "U" shaped arrangement, according to one embodiment.
Figure 5B:
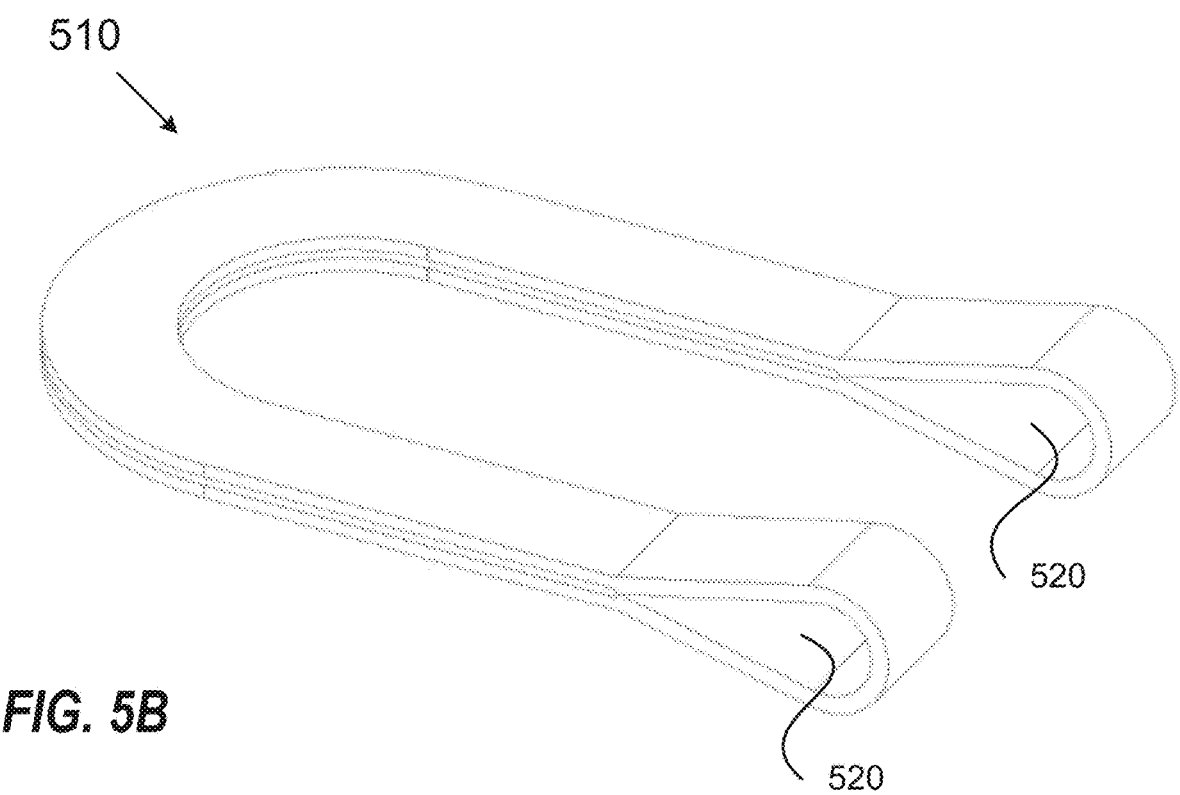

FIGS. 5A-B illustrate an example method for providing a lightweight fiber rope bow having openings formed in each leg thereof. FIG. 5A illustrates fiber rope being wrapped in a plurality of loops 500 that are generally oval shaped. As previously noted, the generally oval shaped fiber rope loops 500 may include any number of loops of fiber rope and the loops may all be the same type of fiber rope or various different types of fiber rope may be included. The fiber rope loops 500 may be secured together in some fashion. The fiber rope loops 500 may be housed in a sleeve. The manner in which the fiber rope loops 500 are secured together, or the material that the fiber rope loops 500 are housed in may vary without departing from the current scope.

FIG. 5B illustrates the generally oval shaped fiber rope loops 500 being folded in half so as to create a "U" shaped fiber rope bow 510. The upper and lower portions of the bow 510 may be secured together in some fashion. As previously noted, the upper and lower portions may be secured together by, for example, forming a material thereover, wrapping a material therearound or providing a sleeve thereover. In the event the fiber rope loops 500 were housed within a sleeve, the upper and lower portions may be secured together by, for example, sewing or gluing the upper and lower sleeve together. The ends of the two legs formed in the "U" shaped fiber rope bow 510 may not be secured together so that openings (receptacles) 520 may be formed. The receptacles 520 may be used, for example, to receive and secure eyelets (e.g., 120) therein. The eyelets may be secured to the receptacles 520 with various securing means including those discussed above with respect to FIGS. 1A-D. For example, a securing means 115 (e.g., glue, tape, rivet, pin, adhesive, weld, mold) may be utilized between the receptacles 520 and the eyelets, or a securing means 130 (e.g., plastic, rubber, sheathing) may be molded therearound, taped thereto or secured around the receptacles 520 and the eyelets.

The various embodiments described above have discussed securing the fiber rope (e.g., loops 110, receptacles 520) around an eyelet (e.g., 120) with various connection means (e.g., 115, 130, 150) to provide support for securing a connection pin (e.g., 320). Securing the fiber rope to the eyelet (the eyelet within the fiber rope) may be complicated and providing a secure connection that is not suspectable to coming apart may be difficult. According to one embodiment, the fiber rope may be secured within eyelets to provide an easier and more secure connection. For example, the receptacles 520 may be placed within the eyelets so as to be secured therewithin. According to one embodiment, the receptacles 520 may be secured within the eyelets when a connection pin passes therethrough.

Figure 6:
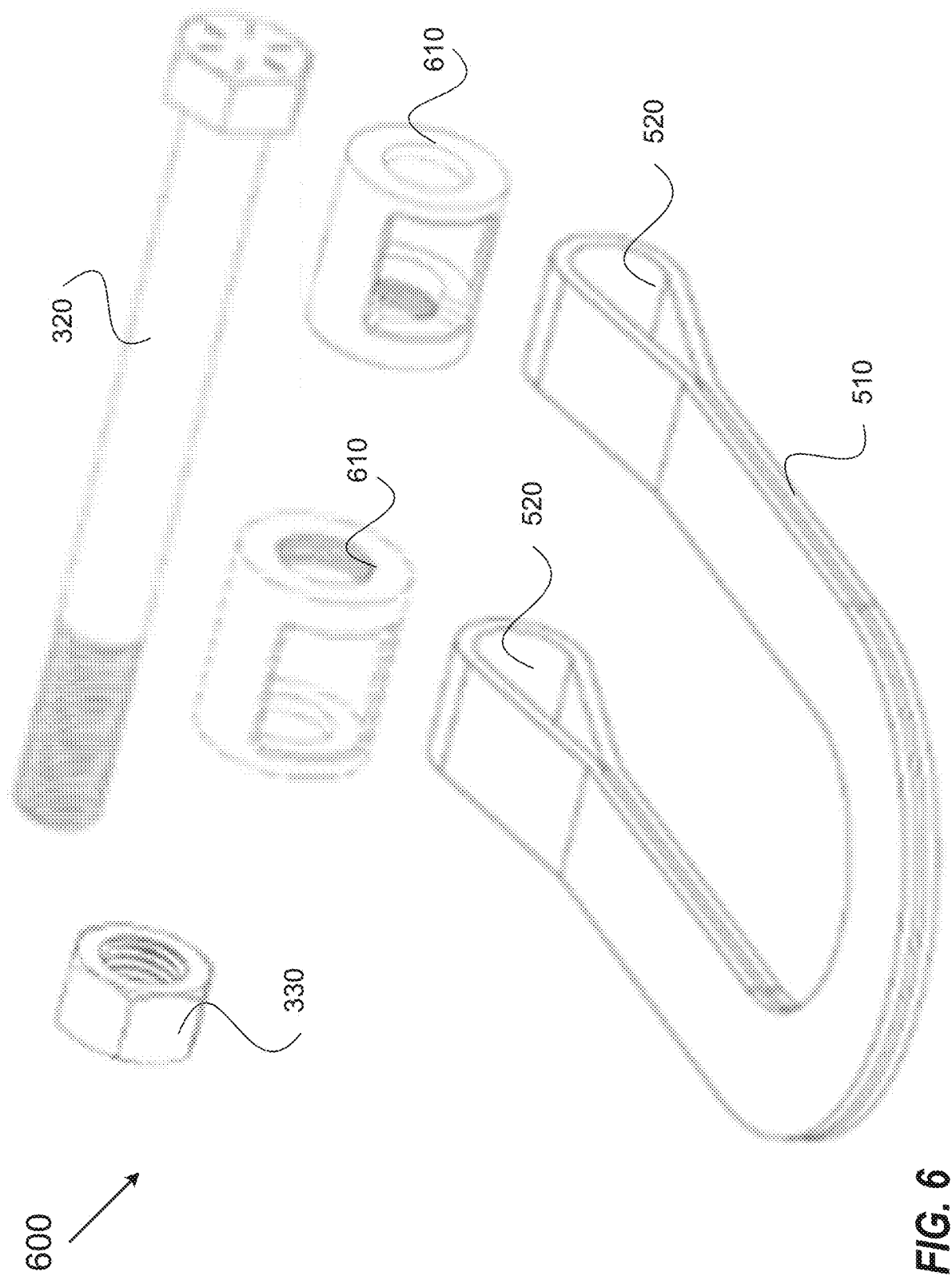
FIG. 6 illustrates an exploded view of an example light weight load bearing shackle, according to one embodiment.

FIG. 6 illustrates an exploded view of an example light weight load bearing shackle 600. The shackle 600 includes a "U" shaped fiber rope bow 510, a pair of barrel eyelets 610, a connection pin (e.g., bolt) 320 and a securing device (e.g., nut) 330. The fiber rope bows 510 includes the receptacles 520 formed at the end of the legs. The barrel eyelets 610 may include an opening in an outer perimeter to receive the receptacles 520 therewithin. The connection pin 320 may pass through the eyelets 610 and the receptacles 520 located within the eyelets 610 in order to secure the receptacle 520 within the eyelets 610. According to one embodiment, a casing (not illustrated) could be utilized between the barrel eyelets 610 to maintain the legs of the bow 510 a minimum distance apart.

Figure 7:
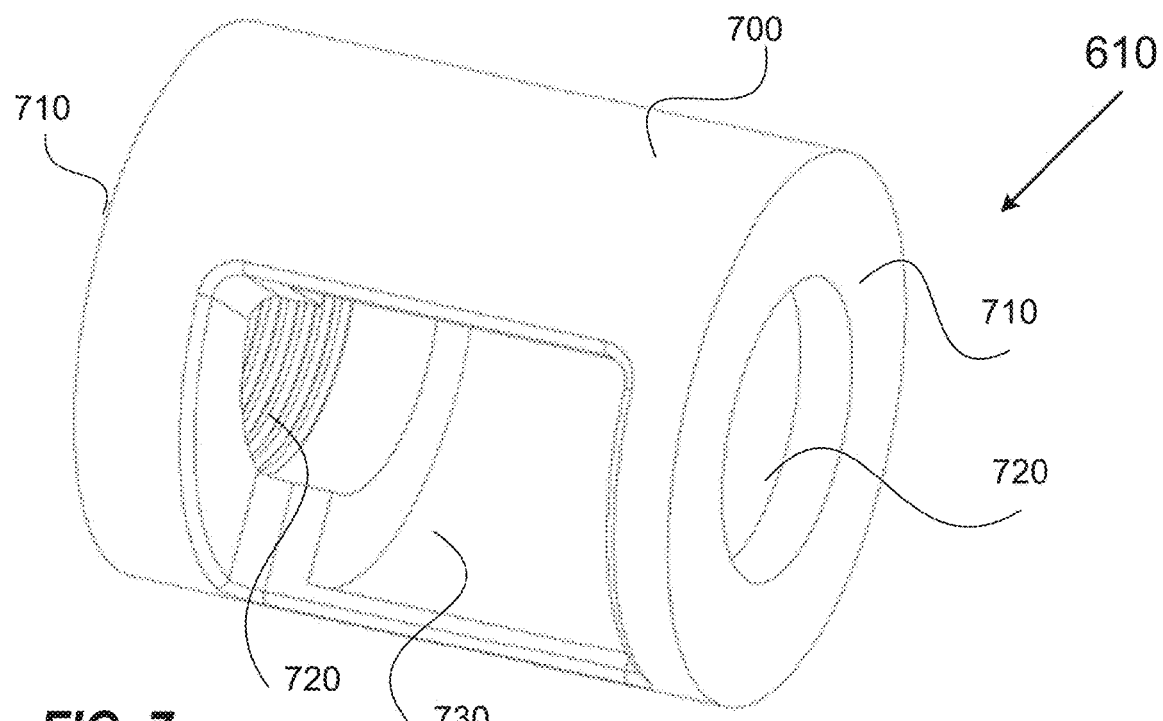
FIG. 7 illustrates a perspective view of an example barrel eyelet, according to one embodiment.

FIG. 7 illustrates a perspective view of an example barrel eyelet 610. The barrel eyelet 610 has a circular body 700 and two sides 710. Each of the sides 710 has a hole 720 formed therein that provides an open interior traversing longitudinally therethrough to allow the connection pin to pass therethrough. The body 700 includes an opening 730 formed therein to receive the receptacle 520. The eyelet 610 is sized so that the receptacle 520 can be housed therewithin. According to one embodiment, at least one of the holes 720 (e.g., hole that would face interior of the fiber rope bow 510) is threaded. The threading could enable a casing (e.g., 300) to be secured thereto so as to maintain the distance of the legs a minimum distance apart.

According to one embodiment, having a shaft within the barrel eyelet 610 to provide support for the connection pin 320 as well as to further secure the receptacle 520 therewithin would be beneficial. According to one embodiment, rather than using a single casing (e.g., 300) to maintain a minimum distance between the legs a separate casing that extends into the barrel eyelet 610 may be associated with each barrel eyelet 610.

Figure 8:
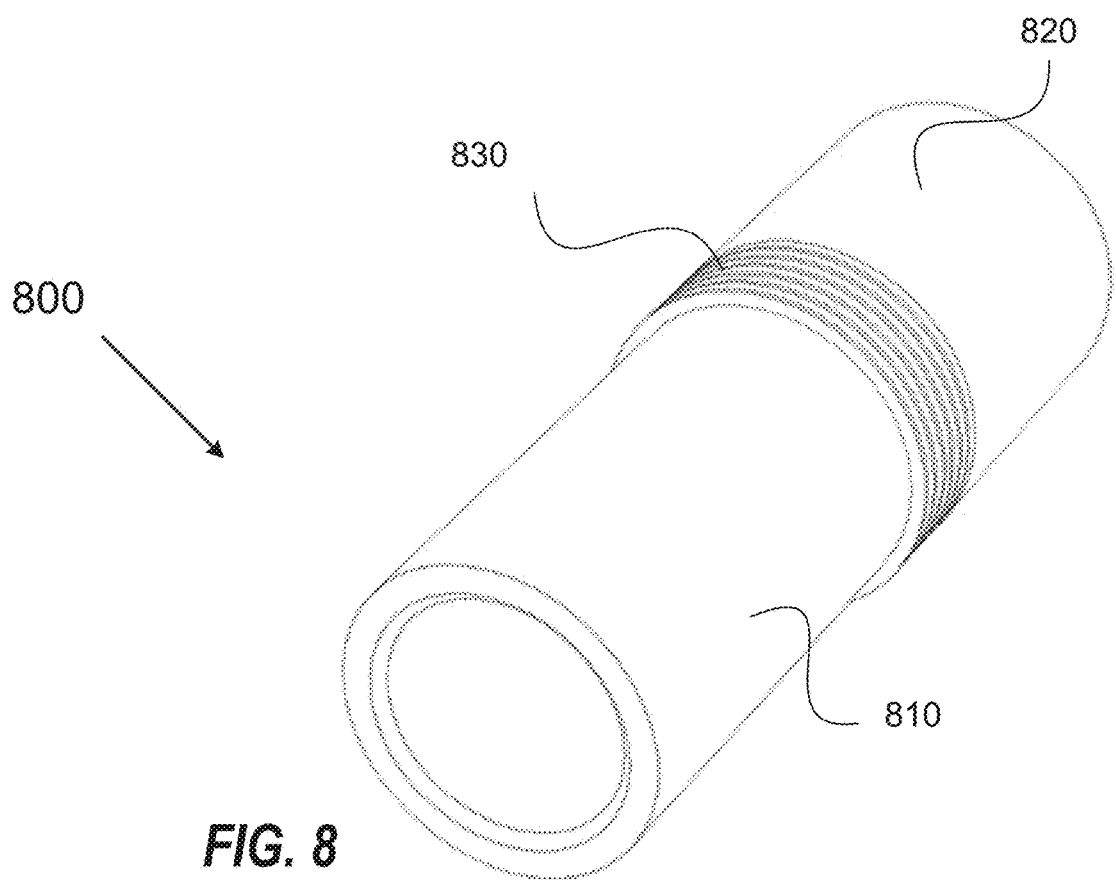
FIG. 8 illustrates a perspective view of an example casing, according to one embodiment.

FIG. 8 illustrates a perspective view of an example casing 800. The casing 800 includes a first portion 810, a second portion 820 and a threaded portion 830. The first portion 810 is narrower than the second portion 820. The threaded portion 830 is located on an end of the second portion 820 that abuts the first portion 810. The first portion 810 could pass through the threaded hole 720 in the barrel eyelet 610 in order to be located internal to the barrel eyelet 610. The casing 800 could then be secured to the barrel eyelet 610 by screwing the threaded portion 830 into the threaded hole 720. The second portion 820 would extend from the barrel eyelet 610 and provide the support for maintaining the legs a minimum distance apart when in use. When in use the two casings may abut each other to maintain the minimum distance. However, the distance could be expanded in which case the ends would not abut. According to one embodiment, an exterior end (opposite threaded portion 830) of the second portion 820 may be threaded (one internally and one externally) to secure the casings 800 together.

Figure 9A:
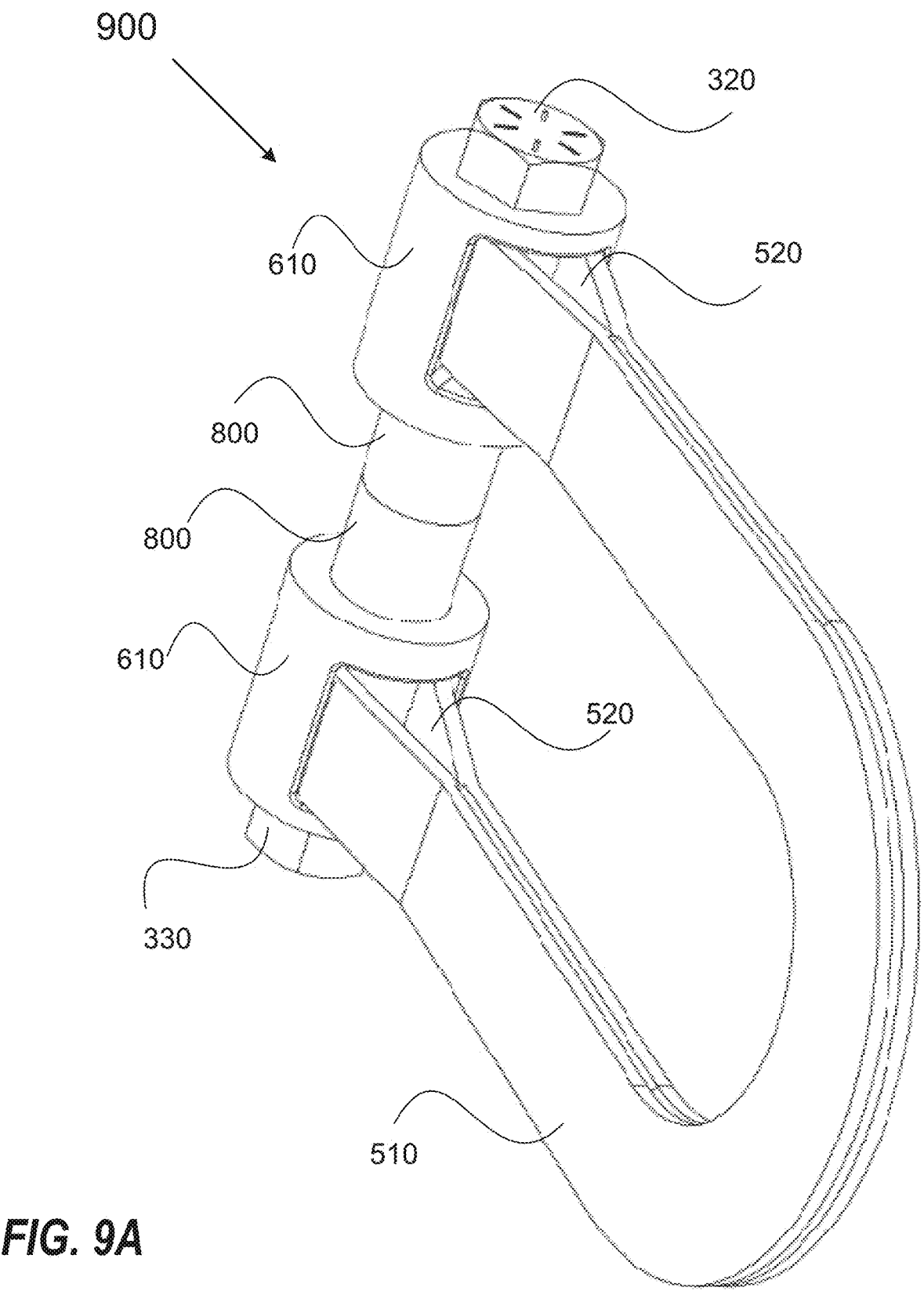
FIGS. 9A-B illustrate perspective and top views of an example light weight load bearing shackle, according to one embodiment.
Figure 9B:
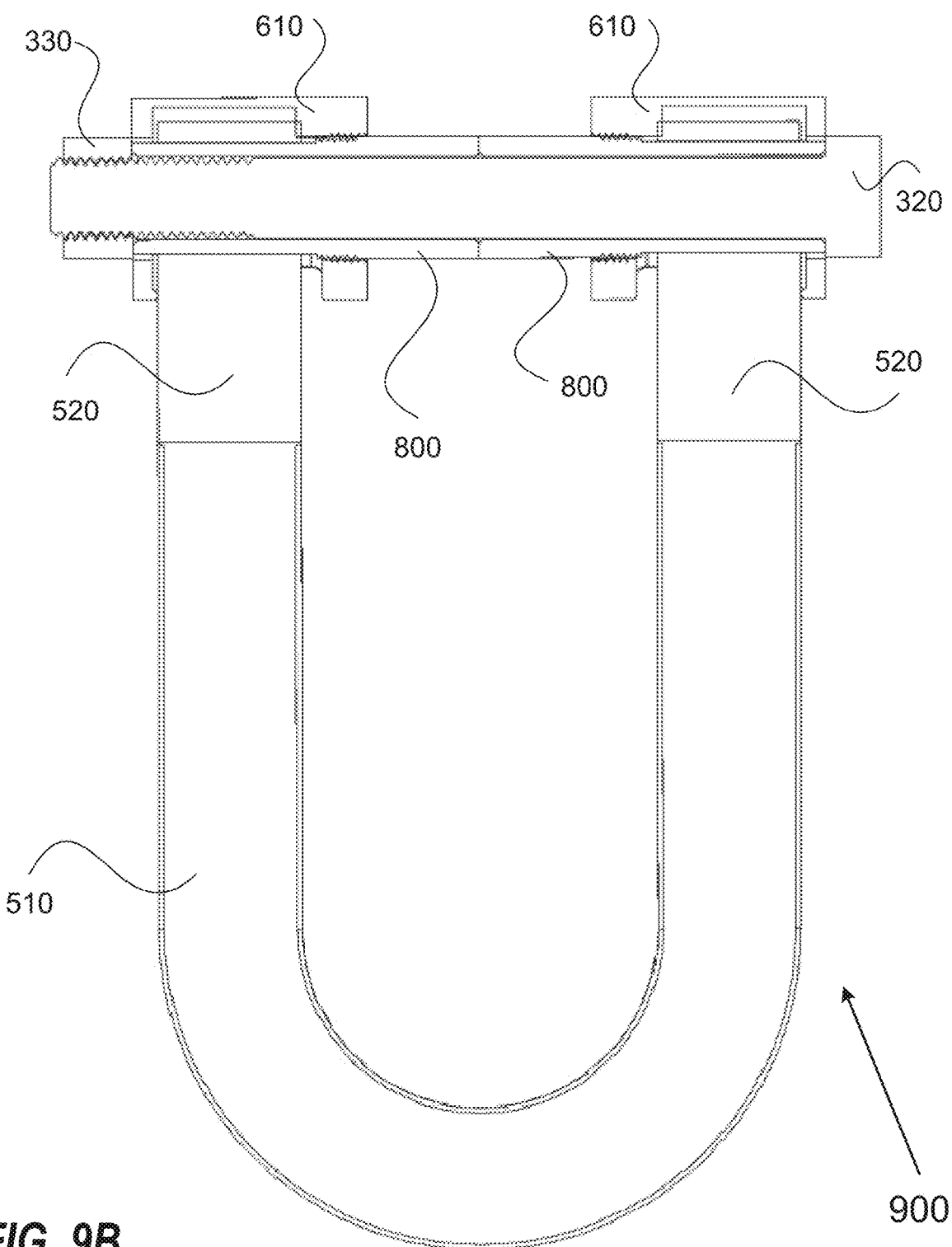

FIGS. 9A-B illustrate perspective and top views of an example light weight load bearing shackle 900. The shackle 900 includes a "U" shaped bow 510 made from fiber rope that includes receptacles 520 on each end. The receptacles 520 are secured within the barrel eyelets 610 and the casings 800. The second portion of the casings 800 extend inside the bow 900 and abut one another to provide the minimum separation between the legs thereof. The first portion of the casings 800 is located within the barrel eyelets 610 and helps secure the receptacles 520 therein as well as provide support for the connection pin 320. The connection pin 320 extends through the barrel eyelets 610 and the casings 800 and is secured in place with the nut 330.

The lightweight load bearing shackle 900 is capable of supporting a similar load to that of a standard shackle. The weight difference enables the shackle 900 to be handled more easily. For example, depending on the load to be supported a standard shackle may weigh so much that it requires an apparatus to move it. A comparable light weight shackle 900 could be moved by an individual. Furthermore, as the shackle 900 is flexible it could be utilized in situations where a standard shackle could not be because it is made of a rigid material. For example, when the connection pin 320 is removed the shackle 900 could be opened up so as to more easily be installed in areas with limited space or be slid under, for example, a support cable that a standard shackle could not.

Rather, than utilizing a barrel eyelet 610 to receive and secure the receptacles 520 therewithin, an eyelet may be utilized that is mounted around the receptacles 520. The eyelet may be a split eyelet (e.g., two halves) that can receive the receptable and then be secured together (e.g., screwed together) around the receptable.

Figure 10:
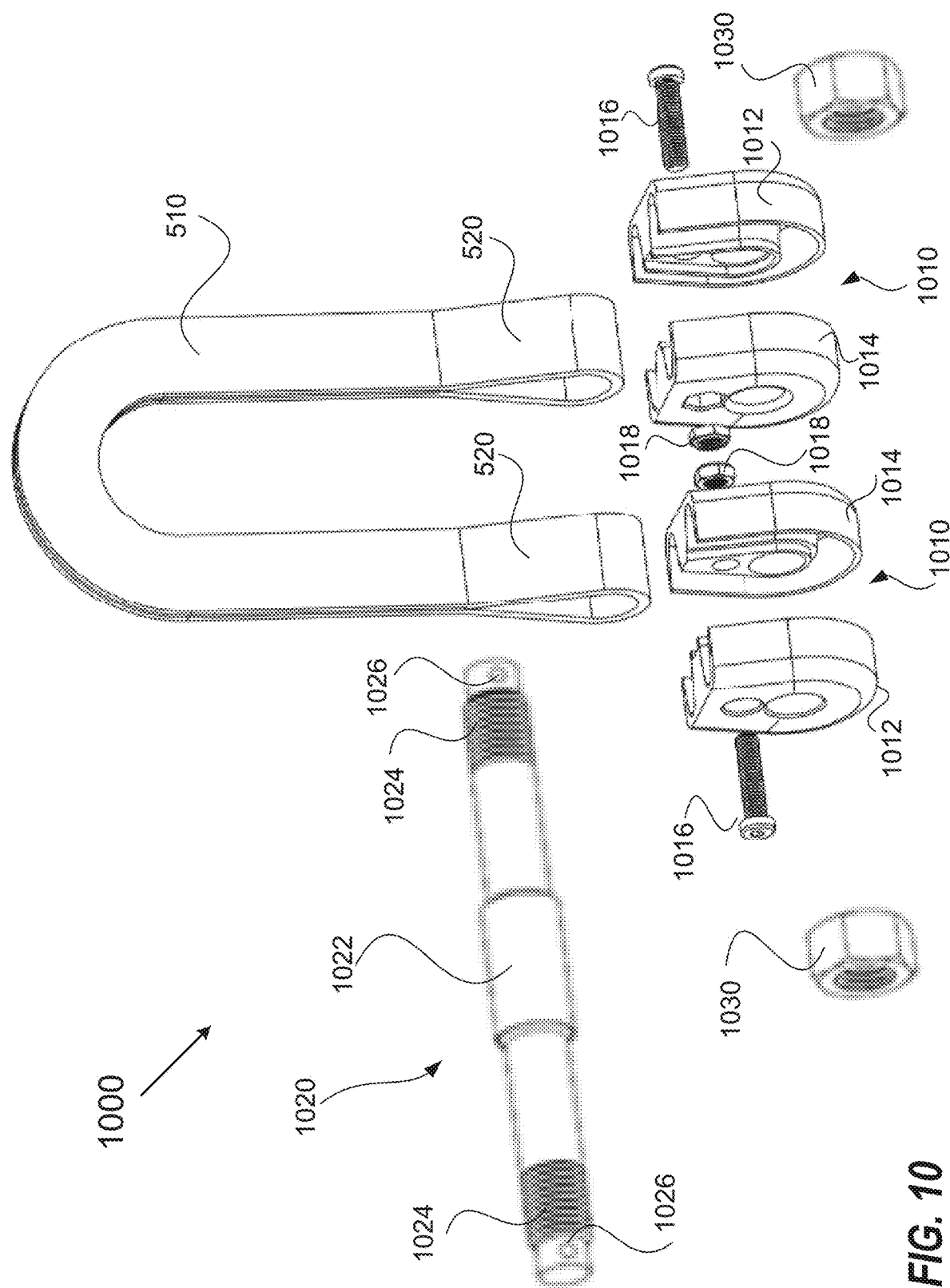
FIG. 10 illustrates an exploded view of an example light weight load bearing shackle utilizing split eyelets, according to one embodiment.

FIG. 10 illustrates an exploded view of an example light weight load bearing shackle 1000 utilizing split eyelets 1010. The shackle 1000 includes a "U" shaped fiber rope bow 510, a pair of split eyelets 1010, a connection pin 1020 and a pair of securing devices (e.g., nuts) 1030. The fiber rope bow 510 includes the receptacles 520 formed at the end of the legs. The split eyelets 1010 may include first and second sides 1012, 1014 that are secured together with screws 1016 and nuts 1018. Each side may include an opening to allow the connection pin 1020 to pass therethrough as well as an opening for allowing the screw 1016 to pass therethrough. As illustrated, the split eyelets 1010 are configured so that the nuts 1018 are located internal to the bow 510 but are not limited thereto.

The connection pin 1020 may include a thicker center portion 1022 and threaded ends 1024. The thicker center portion 1022 may act as a casing to keep the eyelets 1010 and legs separated a defined distance. The threaded ends 1024 may be to receive the nuts 1030 to secure the connection pin 1020 to the bow 510. According to one embodiment, the connection pin 1020 may also include a through hole 1026 formed external to the threaded ends 1024. The through holes 1026 may be to receive a pin, clip, or the like for further securing the connection pin 1020 to the bow 510 (within the eyelets) by ensuring the nuts 1030 cannot come undone.

Figure 11:
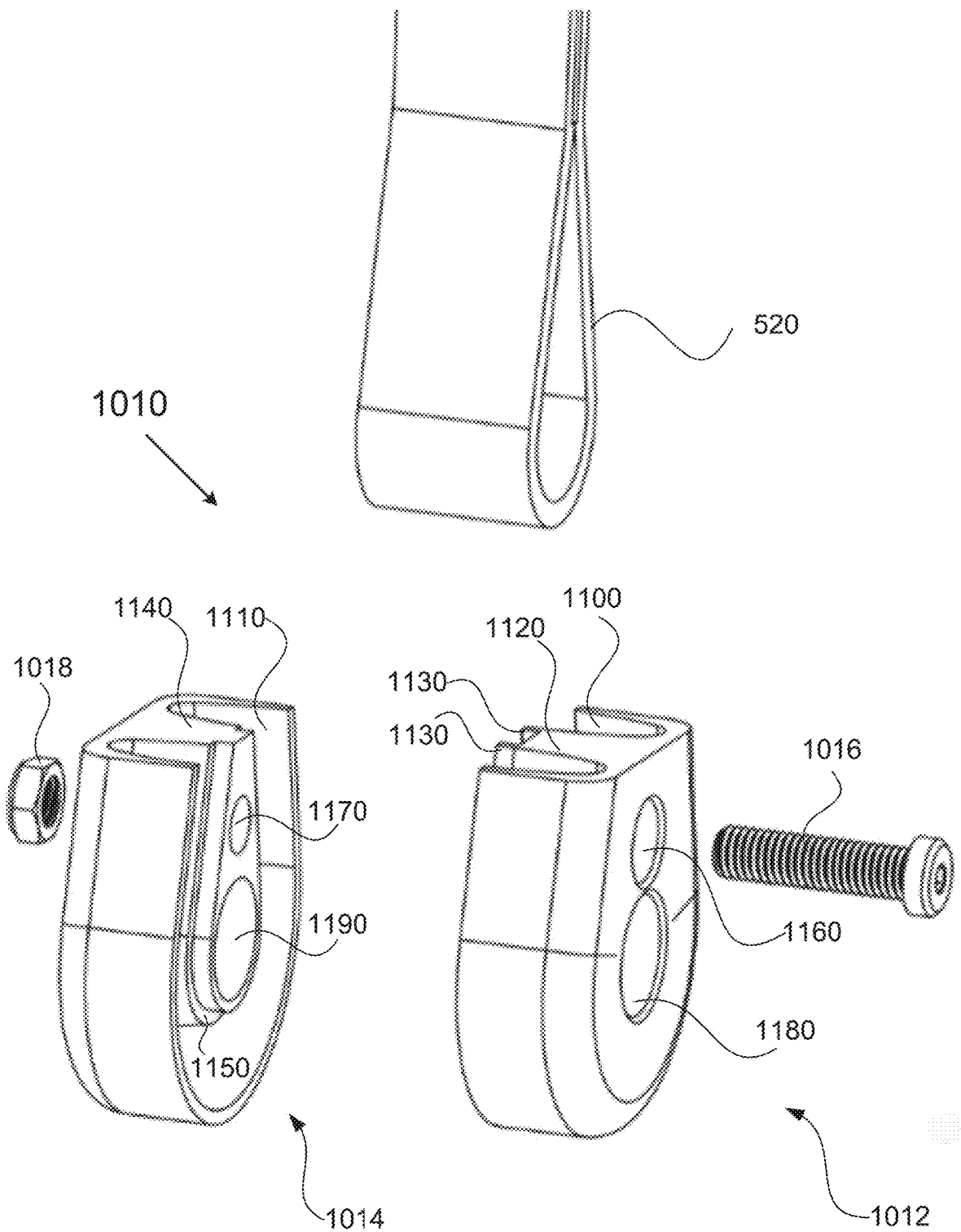
FIG. 11 illustrates a perspective view of an example split eyelet, according to one embodiment.

FIG. 11 illustrates a perspective view of an example split eyelet 1010. The split eyelet 1010 includes a first side 1012 and a second side 1014. The two sides 1012, 1014 have generally the same exterior size and parts that are aligned so as to fit together in operation. The first side 1012 includes a channel 1100 formed therein for receiving a corresponding receptacle 520 of the fiber rope bow 510 (illustrated above the eyelets for context). The second side 1014 includes a channel 1110 that is aligned with the channel 1100 so as to surround the corresponding receptacle 520. The channels 1100, 1110 include a first opening that extends down one side, loops around the bottom and back up the other side to a second opening. The channels 1100, 1110 may be the same depth but are not limited thereto.

A center portion 1120 of the first side 1012 between the channel 1100 includes sidewalls 1130 extending therefrom along an interior edge of the channel 1100. A center portion 1140 of the second side 1012 between the channel 1110 includes a ledge 1150 formed therein along an interior edge of the channel 1110. The ledge 1150 and the sidewalls 1130 are aligned to fit together so as to assist in aligning the sides 1012, 1014 and potentially help secure the sides 1012, 1014 together. The alignment means is not limited to sidewalls and ledge located along an interior of the channels as illustrated and could be other means without departing from the scope.

The center portion 1120 of the first side 1012 includes a hole 1160 therein to enable a screw 1016 that is used to secure the first and second sides 1012, 1014 to pass therethrough. The external side of the hole 1160 may be larger than an interior side (not visible) to enable the head of the screw to be recessed therein. The center portion 1140 of the second side 1014 includes a hole 1170 therein in alignment with the hole 1160 to enable the screw 1016 to pass therethrough. The external side of the hole 1170 (not visible) may be larger than an interior side to enable the nut 1018 to be recessed therein. The external side of the hole 1170 (not visible) may also be shaped (e.g., hexagon) to enable the nut 1018 to be recessed therein. The shaped external opening 1170 is best seen in FIG. 10 (but is not labeled for ease of illustration).

The center portion 1120 of the first side 1012 includes a hole 1180 therein to enable a respective side of the connection pin 1020 to pass therethrough. The center portion 1140 of the second side 1014 includes a hole 1190 therein in alignment with the hole 1180 to enable a respective side of the connection pin 1020 to pass therethrough. The thicker center portion 1022 (casing) of the connection pin 1020 may not fit through the holes 1180, 1190 and thus may keep the legs and the eyelets 1010 a minimum distance apart.

Figure 12:
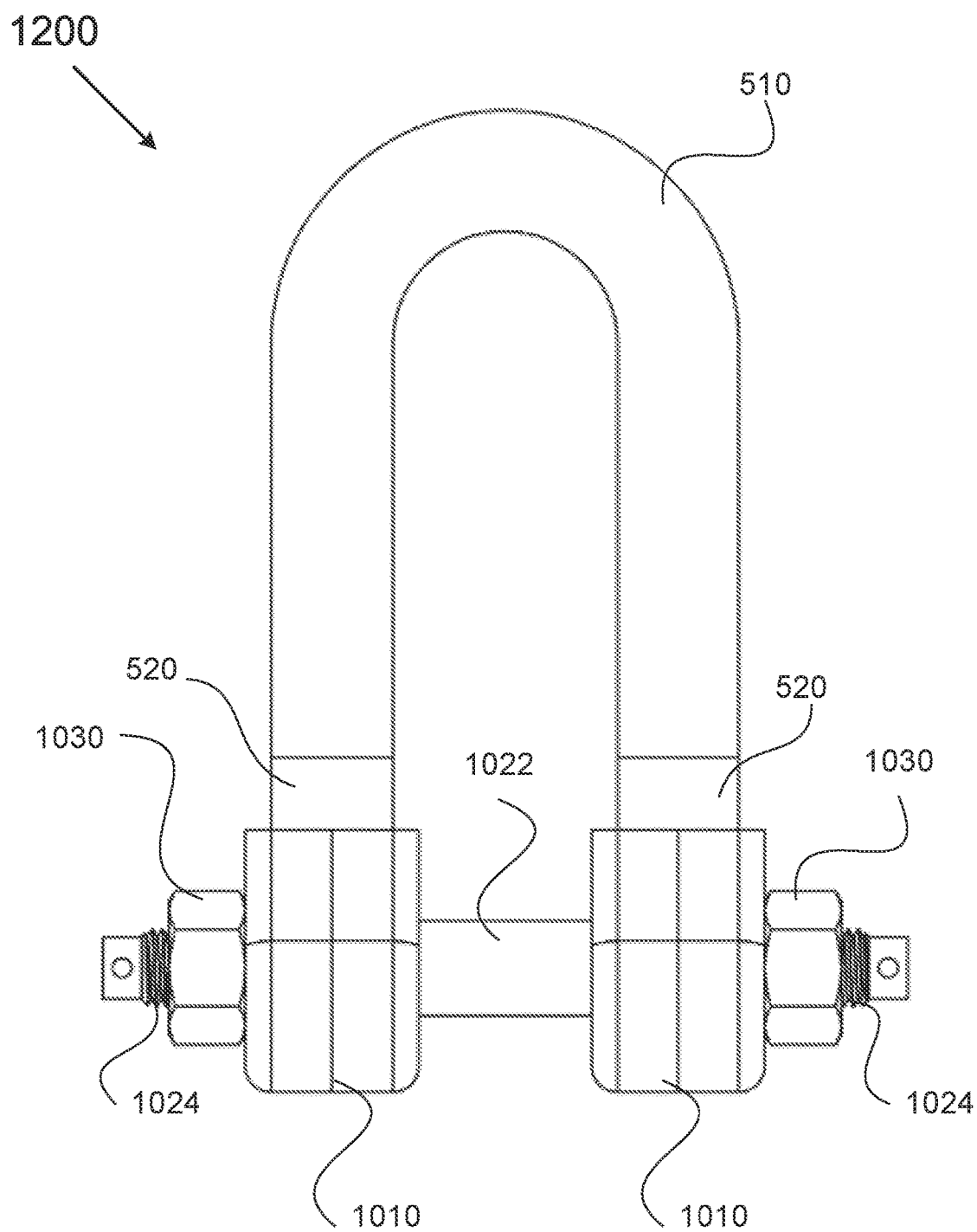
FIG. 12 illustrates a front view of an example light weight load bearing shackle utilizing split eyelets, according to one embodiment.

FIG. 12 illustrates a front view of an example light weight load bearing shackle 1200. The shackle 1200 includes a "U" shaped bow 510 made from fiber rope that includes receptacles 520 on each end. The receptacles 520 are secured within the split eyelets 1010 and are separated by the center portion (casing) 1022 of the connection pin 1020. The threaded portion 1024 of the connection pin 1020 extends outside of the split eyelets 1010 and is secured with the nuts 1030. The connection pin 1020 is not limited to the illustrated example. Rather, the connection pin could include various other embodiments that pass through the split eyelets 1010 and are capable of being secured therein and maintaining the legs a defined distance apart. For example, the connection pin could be a threaded bolt (e.g., 320) that passes through a casing (e.g., 300, 800) and is secured with a nut (e.g., 330).

The light weight load bearing shackle 1200 is capable of supporting a similar load to that of a standard shackle. The weight difference enables the shackle 1200 to be handled more easily. Furthermore, as the shackle 1200 is flexible it could be utilized in situations where a standard shackle could not be because it is made of a rigid material. For example, the shackle 1200 could be rearranged so as to more easily be installed in areas with limited space or be slid under, for example, a support cable that a standard shackle could not.

Although the invention has been illustrated by reference to specific embodiments, it will be apparent that the invention is not limited thereto as various changes and modifications may be made thereto without departing from the scope. Reference to "one embodiment" or "an embodiment" means that a particular feature, structure, or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

The invention claimed is:

1. A lightweight load bearing shackle comprising
   a bow formed from a plurality of loops of fiber rope, wherein the plurality of loops are substantially aligned with one another and are secured together to form a single loop, wherein a first side of the single loop is secured to a second side of the single loop along a center portion of the single loop, wherein the first side and the second side of the single loop are not secured together at a first end and a second end so that the first side of the single loop and the second side of the single loop form a first receptacle at the first end and a second receptacle at the second end;
   a first eyelet secured around the first receptacle, wherein the first eyelet includes a body having an opening formed through an interior thereof such that a perimeter of the opening is formed by the body, and wherein the opening in the first eyelet is aligned with an opening in the first receptacle;
   a second eyelet secured around the second receptacle, wherein the second eyelet includes a body having an opening formed through an interior thereof such that a perimeter of the opening is formed by the body, and wherein the opening in the second eyelet is aligned with an opening in the second receptacle; and
   a connection pin to traverse the opening in the first eyelet and the opening in the second eyelet and to be secured so as remain traversing therethrough.

2. The shackle of claim 1, wherein the fiber rope includes fibers selected from at least one of polypropylene, nylon, polyesters, polyethylene, Aramids and acrylics.

3. The shackle of claim 1, wherein the fiber rope includes fibers selected from at least one of straight, braided and twisted.

4. The shackle of claim 1, further comprising a sheathing to house the single loop.

5. The shackle of claim 1, further comprising a sheathing to house the plurality of loops of fiber rope and align the plurality of loops with one another and secure them together as the single loop.

6. The shackle of claim 5, wherein the sheathing holding the single loop is folded in half to form a substantially "U" shaped bow having a first leg and a second leg, wherein a first side of the substantially "U" shaped bow is secured to a second side of the substantially "U" shaped bow along a center portion of the substantially "U" shaped bow, wherein the first side and the second side of the substantially "U" shaped bow are not secured together at an end of the first leg and an end of the second leg of the substantially "U" shaped bow so the first side and the second side form the first receptacle at the end of the first leg and the second receptacle at the end of the second leg.

7. The shackle of claim 6, wherein the first side and the second side of the substantially "U" shaped bow is secured along the center portion of the substantially "U" shaped bow via stitching.

8. The shackle of claim 1, wherein the first side and the second side of the single loop are secured together along the center portion with a sheathing.

9. The shackle of claim 1, further comprising a casing having an external perimeter larger that the opening in the first eyelet or the opening in the second eyelet, wherein the casing has an open interior to enable the connection pin to pass therethrough, and wherein the casing is located between the first eyelet and the second eyelet to maintain the first eyelet and the second eyelet a minimum distance apart.

10. The shackle of claim 1, wherein the connection pin includes a center portion thicker than outer portions thereof to prevent the center portion from traversing the opening in the first eyelet or the opening in the second eyelet and maintaining the first eyelet and the second eyelet a minimum distance apart.

11. The shackle of claim 1, wherein flexibility of the fiber rope enables configuration of the bow to be adjusted and modified in operation.

12. A lightweight load bearing shackle comprising
   a bow formed from a plurality of loops of fiber rope, wherein the plurality of loops are substantially aligned with one another and are secured together to form a single loop, wherein a first side of the single loop is secured to a second side of the single loop along a center portion of the single loop, wherein the first side and the second side of the single loop are not secured together at a first end and a second end so that the first side of the single loop and the second side of the single loop form a first receptacle at the first end and a second receptacle at the second end;
   a first eyelet secured around the first receptacle, wherein the first eyelet includes a first side and a second side that each have an aligned opening, wherein the first side and the second side are provided on opposite sides of the first receptacle and are secured together around the first receptacle such that an opening in the first eyelet is aligned with an opening in the first receptacle;
   a second eyelet secured around the second receptacle, wherein the second eyelet includes a first side and a second side that each have an aligned opening, wherein the first side and the second side are provided on opposite sides of the second receptacle and are secured together around the second receptacle such that an opening in the second eyelet is aligned with an opening in the second receptacle; and a connection pin to traverse the first eyelet and the second eyelet and to be secured therewithin.

13. The shackle of claim 12, wherein at least one of the first side and the second side of the first eyelet and the second eyelet includes a channel for receiving a respective receptacle.

14. The shackle of claim 12, wherein at least one of the first side and the second side of the first eyelet and the second eyelet includes an alignment means for ensuring the first side and the second side of the first eyelet and the second eyelet are secured together in alignment.

15. A method of making a lightweight load bearing shackle, the method comprising wrapping a fiber rope into a plurality of loops;

placing the plurality of loops into a sheathing;

securing a first side of the sheathing to a second side of the sheathing along a center portion thereof, wherein the first side and the second side not secured together at a first end create a first receptacle and the first side and the second side not secured together at a second end create a second receptacle;

placing a first side of a first split eyelet over a first edge of the first receptacle with an opening in the first split eyelet in alignment with an opening in the first receptacle;

placing a second side of the first split eyelet over a second edge of the first receptacle with the opening in the first split eyelet in alignment with the opening in the first receptacle;

securing the first side of the first split eyelet to the second side of the first split eyelet;

placing a first side of a second split eyelet over a first edge of the second receptacle with an opening in the second split eyelet in alignment with an opening in the second receptacle;

placing a second side of the second split eyelet over a second edge of the second receptacle with the opening in the second split eyelet in alignment with the opening in the second receptacle; and securing the first side of the second split eyelet to the second side of the second split eyelet.

16. The method of claim 15, further comprising placing a connection pin through the first split eyelet;

placing the connection pin through the second split eyelet; and securing the connection pin in place.

17. The method of claim 16, further comprising placing the connection pin through a casing between the first split eyelet and the second split eyelet, where the casing is wider than the openings in the first and the second split eyelets so as to maintain the first and the second split eyelets a minimum distance apart.

18. The method of claim 16, further comprising placing a center portion of the connection pin between the first and the second split eyelets, wherein the center portion is wider than outer portions of the connection pin and the openings in the first and the second split eyelets so as to maintain the first and the second split eyelets a minimum distance apart.

19. A lightweight load bearing shackle comprising a plurality of loops of fiber rope substantially aligned with one another;

a sheathing to house the plurality of loops, wherein the sheathing forms a single loop, wherein a first side of the single loop is secured to a second side of the single loop along a center portion of the single loop, wherein the first side and the second side of the single loop are not secured together at a first end and a second end so that the first side of the single loop and the second side of the single loop form a first receptacle at the first end and a second receptacle at the second end;

a first split eyelet secured around the first receptacle, wherein a first side of the first split eyelet is placed over a first edge of the first receptacle with an opening in the first split eyelet in alignment with an opening in the first receptacle, a second side of the first split eyelet is placed over a second edge of the first receptacle with the opening in the first split eyelet in alignment with the opening in the first receptacle, and the first side of the first split eyelet and the second side of the first split eyelet are secured together; and a second split eyelet secured around the second receptacle, wherein a first side of the second split eyelet is placed over a first edge of the second receptacle with an opening in the second split eyelet in alignment with an opening in the second receptacle, a second side of the second split eyelet is placed over a second edge of the second receptacle with the opening in the second split eyelet in alignment with the opening in the second receptacle, and the first side of the second split eyelet and the second side of the second split eyelet are secured together.

20. The shackle of claim 19, further comprising a connection pin having a center portion that is thicker than a first end or a second end, wherein the connection pin is placed between the first and the second split eyelets so that the center portion is located therebetween, wherein the center portion is wider than the openings in the first and the second split eyelets so as to maintain the first and the second split eyelets a minimum distance apart.

* * * * *